United States Patent [19]

Belval et al.

[11] 4,332,170
[45] Jun. 1, 1982

[54] SUB-ASSEMBLY FOR DETECTING LEAKS OF A LIQUID METAL

[75] Inventors: Michel Belval, Volx; Chantal Casselman, Manosque; Jean-Claude Malet, Venelles; Christian Prats, Versailles; Jean Meneret, Sevres, all of France

[73] Assignees: Commissariat a l'Energie Atomique, Paris; Carbonisation Entreprise et Ceramique (C.E.C.), Montrouge, both of France

[21] Appl. No.: 144,915

[22] Filed: Apr. 29, 1980

[30] Foreign Application Priority Data

May 3, 1979 [FR] France .................................. 79 11142

[51] Int. Cl.³ ............................................. G01M 3/08
[52] U.S. Cl. ................................. 73/40.5 R; 340/605; 376/250
[58] Field of Search .................. 176/19 LD; 73/40 R, 73/40.5; 340/605

[56] References Cited

U.S. PATENT DOCUMENTS

| 2,759,175 | 8/1956 | Spalding | 340/605 |
| 3,721,898 | 3/1973 | Dragoumis et al. | 340/605 |
| 3,721,970 | 3/1973 | Niemoth | 340/605 |
| 4,143,540 | 3/1979 | Peterson et al. | 73/40 |

FOREIGN PATENT DOCUMENTS

| 579184 | 6/1933 | Fed. Rep. of Germany | 340/605 |
| 1377519 | 9/1964 | France | 340/605 |
| 2455739 | 11/1980 | France | 340/605 |
| 703081 | 1/1954 | United Kingdom | 176/19 LD |

Primary Examiner—Sal Cangialosi
Attorney, Agent, or Firm—Lane, Aitken, Kice & Kananen

[57] ABSTRACT

A sub-assembly for detecting leaks of a liquid metal circulating in a component of a circuit such as a conduit or a valve or contained in a storage means such as a reservoir, comprising electrically conductive elements arranged inside an electrically insulating material, wherein said insulating material consists of a rigid shell the inner surface of which is adapted to the outer surface of said component, while open grooves are formed on the inner surface of the shell for receiving said electrically conductive elements, the grooves having a widened portion remote from the inner surface of the shell, receiving the electrically conductive elements, and a portion of reduced width located between the widened portion and the inner surface of the shell and maintaining the electrically conductive elements at a spacing from said inner surface.

15 Claims, 6 Drawing Figures

SUB-ASSEMBLY FOR DETECTING LEAKS OF A LIQUID METAL

BACKGROUND OF THE INVENTION

The invention relates to a sub-assembly for detecting leaks of a liquid metal circulating in a component of a circuit such as a conduit or a valve or contained in a storage means such as a reservoir, and a detection apparatus comprising a plurality of sub-assemblies of this type.

In certain applications, notably in breeder nuclear reactors, a liquid metal such as molten sodium circulates in the circuits. For obvious safety reasons, particularly when the liquid metal is sodium, it is necessary to be able to detect leaks of this metal, along the circuit or in a reservoir containing the metal, rapidly and accurately.

A certain number of apparatus have been proposed for detecting leaks of this kind. The majority of these apparatus comprise electrically conductive elements, in the form of wires, plates or grids, for example, associated with an electrically insulating support material interposed between these electrically conductive elements and the conduit in which the liquid metal circulates. The support consisting of insulating material may consist, for example, of woven silica threads or a layer of permeable felt. Depending on the particular apparatus, a leak of the liquid metal is detected either by the establishing of electrical contact between two adjacent electrically conductive elements or by the establishing of an electrical contact between one or more of these electrically conductive elements and the conduit. In every case, the leak is not detected until the liquid metal leaking out has passed through the support of electrically insulating material, which does not usually occur until after a relatively long time, up to several minutes. Obviously, this response time is not adequate, particularly when the liquid metal is sodium, owing to the risk of fire created by the existence of a leak. Moreover, the known apparatus are fragile and have to be handled with great care, particularly when they operate at relatively high temperature, as is the case when they surround conduits in which liquid sodium is circulating.

BRIEF SUMMARY OF THE INVENTION

The aim of the invention is to provide an apparatus for detecting leaks of a liquid metal which does not have the disadvantages of the known apparatus, and which is characterised in particular by a particularly short response time and by being extremely easy to handle.

To this end, the invention proposes a sub-assembly for detecting leaks of a liquid metal circulating in a component of a circuit such as a conduit or a valve or contained in a storage means such as a reservoir, comprising electrically conductive elements arranged inside an electrically insulating material, characterised in that the insulating material consists of a rigid shell the inner surface of which is adapted to the outer surface of said component, whilst open grooves are formed on the inner surface of the shell to receive said electrically conductive elements, these grooves having a wider portion, remote from the inner surface of the shell, which receives the electrically conductive elements, and a portion of reduced width, located between the widened portion and the inner surface of the shell and holding the electrically conductive elements at a spacing from said inner surface.

Owing to the arrangement of the electrically conductive elements in grooves which are open facing the conduit, it is obvious that any leak of liquid metal occurring in this conduit will immediately cause electrical contact to be made by this metal between at least one of the electrically conductive elements and the conduit. Moreover, the construction of the apparatus in the form of a rigid shell makes the handling, transporting and assembling of these sub-assemblies much easier than was the case with the known apparatus used hitherto.

According to another feature of the invention, the widened portion of the grooves, in cross section, has a shape which is complementary to the outer casing of the electrically conductive elements.

According to a first alternative embodiment of the invention, the electrically conductive elements are metal wires wound in a coil inside the grooves.

According to a second embodiment, the electrically conductive elements are metal strips forming undulations inside the grooves.

According to another secondary feature of the invention, the rigid shell is made of a material comprising fibres embedded in a hardened reinforcing binder.

According to a particular embodiment of the invention, a sub-assembly of this kind for detecting leaks of a liquid metal circulating in a conduit is characterised in that the rigid shell is in the form of a hollow half-cylinder, whilst the grooves are helical, parallel to one another and uniformly spaced. Preferably, the grooves are thereby inclined substantially at 45° relative to the axis of the shell, so that the sub-assembly can be mounted either on a vertical conduit or on a horizontal or oblique conduit.

According to another embodiment of the invention, a sub-assembly for detecting leaks of a liquid metal circulating in a conduit is characterised in that the rigid shell is in the form of a hollow half-cylinder, wherein the grooves are parallel to the axis of the half-cylinder and uniformly spaced. The electrically conductive elements can then be arranged in the grooves over different lengths and/or at different spacings, so as to define transverse zones which are electrically identifiable relative to one another. It is thus possible to obtain a veritable electric coding of the sub-assembly, by means of which a leak of the liquid metal inside a relatively long sub-assembly can be accurately located.

According to another feature of the invention, each of the electrically conductive elements is electrically connected at both ends to terminals opening on to the outer surface of the shell. In this case, electrically conductive bars may be provided on the outer surface of the shell, between some of the terminals, so as to connect a plurality of electrically conductive elements in series.

The invention also relates to an apparatus for detecting leaks of a liquid metal circulating in a circuit comprising one or more components such as a conduit or a valve, characterised in that it comprises a plurality of sub-assemblies arranged in pairs so as to surround the circuit and means for detecting a short circuit between the circuit and any one of the electrically conductive elements. The latter may define heating resistors capable of being connected to a suitable current source for heating the circuit. This feature avoids having to use two separate apparatus, notably in the case of breeder reactors cooled by liquid sodium, for detecting leaks of the sodium and for preheating the circuit or heating the circuit and the sodium should the latter have solidified as the result of a prolonged shutdown of the reactor.

According to another feature of the invention, the electrically conductive elements accommodated in the grooves formed in one or more of the rigid shells are connected to one another to form adjacent loops connected to said means for detecting a short circuit and, optionally, to the voltage source for heating the conduit.

According to an alternative embodiment of the invention, when each of the electrically conductive elements of one sub-assembly is electrically connected at both ends to terminals opening on to the outer surface of the corresponding shell, electrically conductive bars are provided on the outer surface of the shells between some of the terminals of two adjacent sub-assemblies, so as to connect the electrically conductive elements of these sub-assemblies in series electrically.

BRIEF DESCRIPTION OF THE DRAWINGS

A particular embodiment of the invention will now be described, as a non-restrictive example, with reference to the accompanying drawings, wherein.

DETAILED DESCRIPTION OF THE PREFERRED EMBODIMENTS

Figure 1:
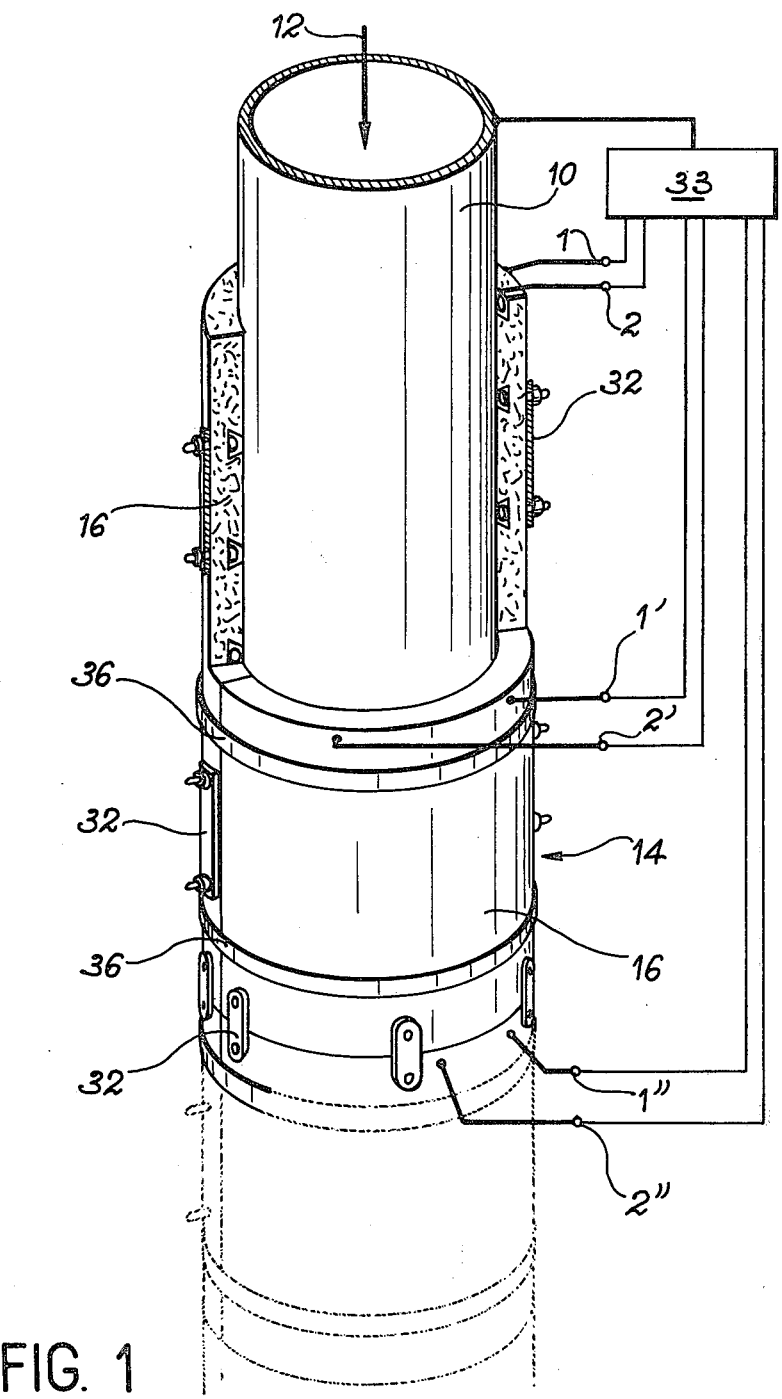
FIG. 1 is a perspective view showing an apparatus for detecting leaks of a liquid metal circulating in a conduit, this apparatus comprising a plurality of sub-assemblies constructed according to the invention.

FIG. 1 shows a vertical tubular conduit 10 in which a liquid metal circulates, in the direction of arrow 12, for example. The conduit 12 may constitute part of the secondary circuit of a breeder nuclear reactor, in which case the liquid metal is sodium.

Figure 2:
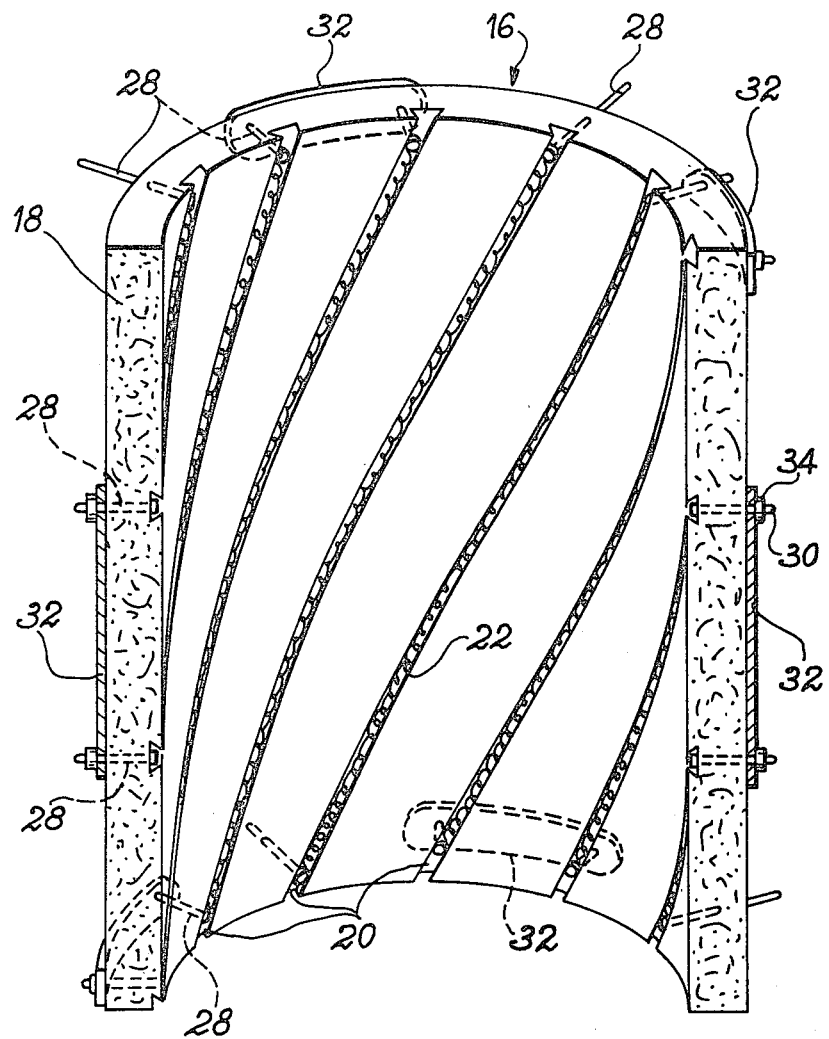
FIG. 2 is an exploded perspective view of one of the sub-assemblies constituting the apparatus shown in FIG. 1, showing, in particular, the inner surface of this sub-assembly.

According to the invention, the conduit 10 is surrounded by a leak detecting apparatus designated 14, comprising a certain number of sub-assemblies 16 one of which is shown on its own in FIG. 2. Each sub-assembly 16 comprises a rigid shell 18 which is in the form of a hollow half-cylinder the internal surface of which is adapted to the outer surface of the conduit 10. The shell 18 is made of a rigid, electrically insulating material such as, for example, silico-aluminate fibres (mineral wool) embedded in a hardened reinforcing binder (suspension of colloidal silica and sodium silicate). In this case, the rigid shell 18 may be obtained either by drying, followed by firing of the fibrous material previously impregnated with the reinforcing binder in liquid form, or by sedimentation, in which case the fibres are suspended in a reinforcing liquid and then deposited by sedimentation or suction on a porous surface such as canvas.

As a guide, it should be noted that the specific weight of the material from which the shells are made is between 250 kg/m$^3$ and 350 kg/m$^3$. Dry breaking tests carried out on test pieces with a width b (in cm) and a thickness d (in cm) resting on two supports placed at a spacing l (in cm), the breakage of which is effected with a load W (in kg), showed that the dry breaking modulus of this material, defined by the formula $R = (3Wl/2bd^2)$, is between 50 kg/cm$^2$ and 100 kg/cm$^2$.

Figure 3:
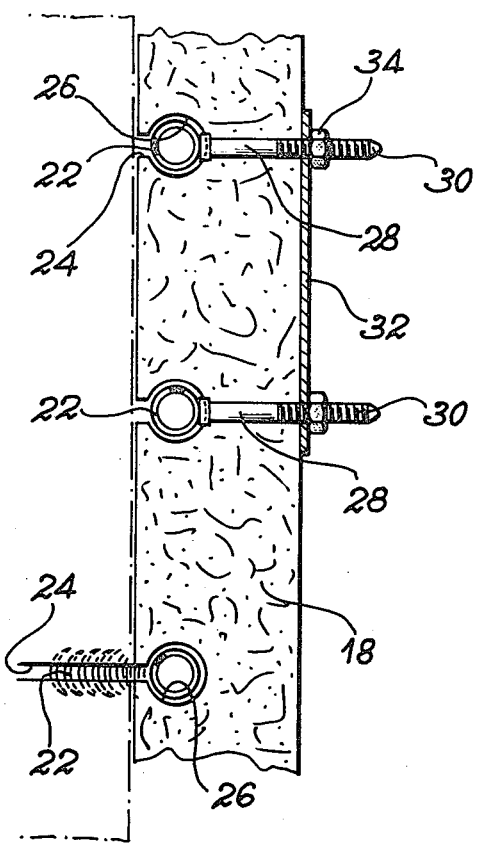
FIG. 3 is a longitudinal section through the sub-assembly shown in FIG. 2, showing a first variant of the invention, in which the electrically conductive elements consist of helically wound wires.
Figure 4:
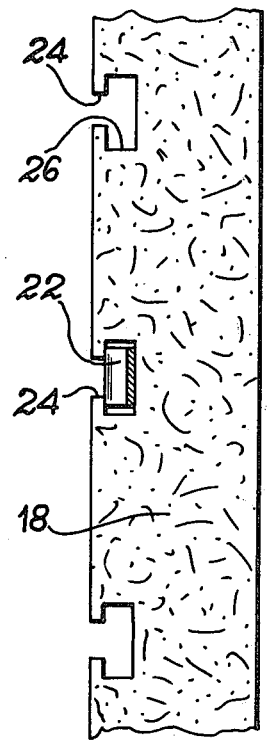
FIG. 4 is a sectional view comparable to FIG. 3, showing a second variant of the invention, in which the electrically conductive elements consist of metal strips forming undulations.
Figure 5:
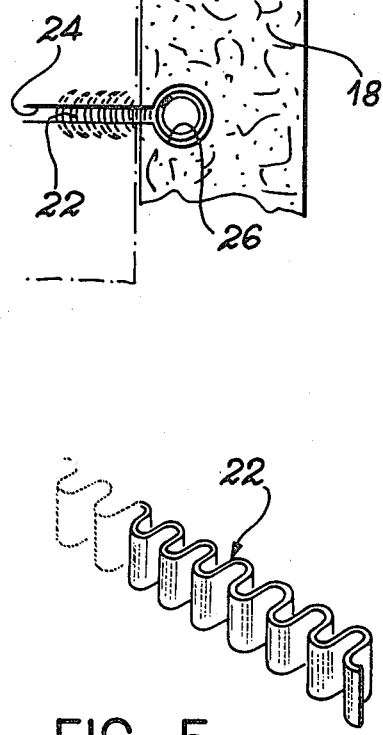
FIG. 5 is a perspective view which shows, separately, one of the electrically conductive elements in the variant according to FIG. 4.

As shown particularly in FIG. 2, open grooves 20 are formed on the inner surface of the shell 18. Preferably, the grooves 20 are helical, parallel to one another and uniformly spaced, and define an angle of about 45° relative to the axis of the shell 18. Each of the grooves 20 receives an electrically conductive element 22 which may consist either of an electric wire wound in a coil, as shown in FIG. 3, or of a metal strip forming undulations as shown in FIGS. 4 and 5. The electrically conductive strips 22 are held in the grooves 20 by retaining means, preferably consisting of a portion of reduced width 24 of the grooves, this portion 24 being located between the inner surface of the shell 18 and a widened portion 26 in which the elements 22 are accommodated. The grooves 20 may be in the form of a dovetail in cross section, as shown in FIGS. 1 and 2. However, the portion 26 housing the elements 22 is preferably shaped in cross section so as to be complementary to the outer casing of these elements, so that the grooves 20 thus have the form shown in FIG. 3 when the elements 22 are helically wound wires, or a mortise shape as shown in FIG. 4 when the elements 22 are strips with undulations.

As shown in FIG. 2, in particular, each of the conductive elements 22 is electrically connected at both ends to terminals 28 consisting of rods passing through suitable passages formed between the bases of the grooves 20 and the outer surface of the shell 18. The rods 28 terminate outside the shell 18 in threaded portions 30 by means of which they can be connected as required to an adjacent rod or to a suitable external apparatus. Thus, two adjacent rods 28 can be connected to each other by means of a conductive bar 32 fixed by nuts 34 screwed on to the threaded portions 30.

As shown in FIG. 2, the bars 32 may connect only the adjacent rods 28 of one sub-assembly 16, so as to define on this sub-assembly two or more electrically conductive circuits capable of being connected by terminals 28 such as the terminals 1–2, 1'–2' and 1"–2" to means (not shown) for detecting any short circuit between the conduit 10 and each of these circuits.

Obviously, as shown in FIG. 1, the bars 32 may also be used to provide an electrical connection between the electrically conductive elements of two adjacent sub-assemblies 16 and to connect these sub-assemblies to each other mechanically. Thus, a great variety of circuits can be formed using the electrically conductive elements 22 and the bars 32 depending on the particular structure of the circuit which is to be monitored. Thus, the electrically conductive elements of one sub-assembly 16 or a plurality of successive sub-assemblies may be connected in pairs in the form of loops, so that the terminals 28, such as the terminals 1–2, 1'–2' and 1"–2" in FIG. 1, of the circuits thus formed are located at the same end of one of the sub-assemblies 16 or on the same side thereof. Whatever electric circuits are thus formed inside the apparatus 14, the terminals 28 of these circuits, such as 1-2, 1'-2' or 1"-2" in FIG. 1, are connected to a system for detecting insulation defects 33 which is also in electrical contact with the conduit 10, so as to detect any short circuit between this conduit and any of the circuits. Monitoring may thus be carried out continuously or by scanning. The electronic detection system 33 performs the following functions:

checking the continuity of each of the circuits ending at the terminals 28, monitoring the insulation of each circuit from the conduit 10, triggering an alarm if there is a fault.

The operation of the system 33 is based on measurement of the insulation resistance by the conventional method of the Wheatstone bridge. A zero comparator circuit detects the fluctuation in polarity during the reduction in the insulation resistance produced by the earthing of a circuit ending at the terminals 28 caused by the sodium.

A potentiometer is used to select the detection threshold by displacement of the point of equilibrium of the Wheatstone bridge, for example between a few hundred ohms and 10,000 ohms. Each loop or circuit is tested in turn by means of a scanning device which triggers an alarm if the corresponding loop is defective. This principle makes it possible to limit false alarms, by eliminating temporary defects of the parasitic type. When the alarm is triggered, it is maintained until manual resetting is carried out, even if the defect disappears. At the same time, when the detection means 14 is mounted on a conduit in which liquid sodium is circulating, the terminals 1, 2 of each of the electric circuits defined by the apparatus are also connected to a suitable current source (not shown) by means of which the conduit 10 can be pre-heated and the conduit and the sodium can be heated in the case of prolonged shutdown of the reactor. This heating is obtained by a Joule effect inside the electrically conductive elements 22 which also define heating resistors.

As shown particularly in FIG. 1, the sub-assemblies 16 constituting the apparatus 14 are assembled in pairs around the conduit 10, for example by means of hoops 36 or by means of conductive or insulating bars 32, depending on the configuration of the electrical circuits which it is desired to obtain. Similarly, the sub-assemblies 16 arranged in succession along the conduit 10 may also be connected to one another, for example by means of conductive or insulating bars 32.

Figure 6:
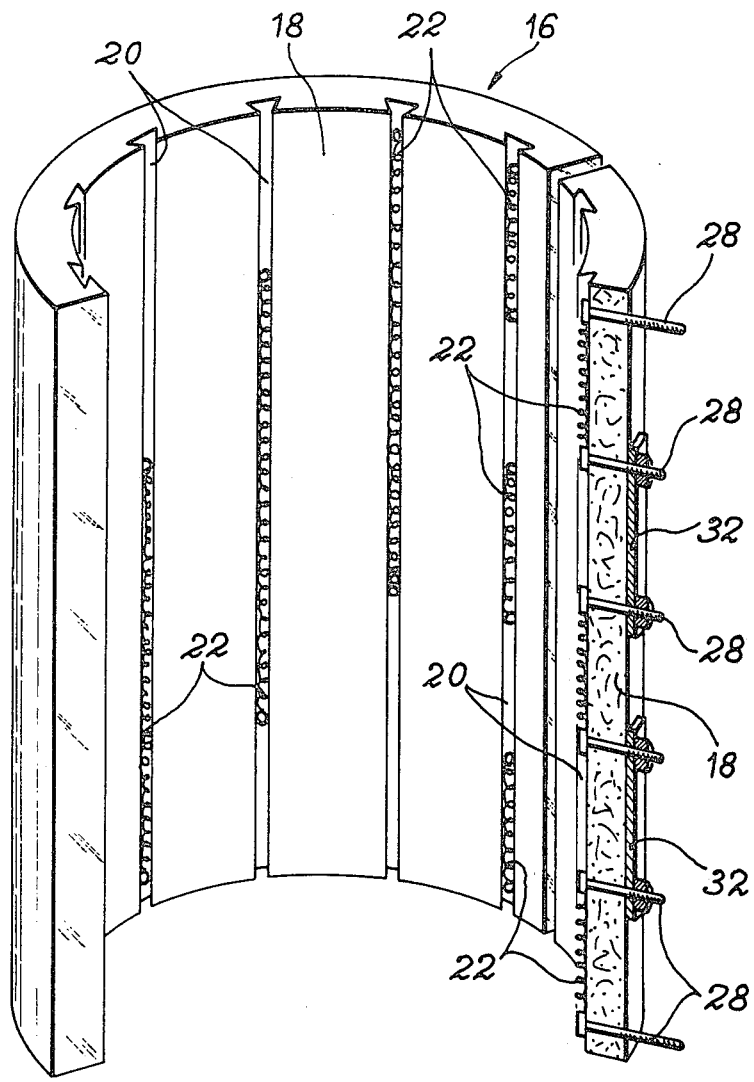
FIG. 6 is an exploded perspective view showing a sub-assembly wherein the electrically conductive elements are arranged so as to form an electrical coding.

In the embodiment in FIG. 6, the open grooves 20 formed in the sub-assemblies 16, one of which is shown in section along one of the grooves, extend parallel to the axis of the half-cylinder defined by the shells 18. Moreover, the electrically conductive elements 22 are arranged in the grooves 20 over different lengths from one groove to another and/or at different spacings, so as to define coded transverse zones which can thus be identified electrically in relation to one another. Thus, if a leak of sodium occurs in the conduit at one or more of these zones, electrical contact is made between the conduit and the conductive elements 22 located in these zones, so that by detecting the electrical contacts thus made, and knowing the plan of distribution of the coded zones along the conduit, it is possible to locate the leak thus detected, with perfect accuracy. In practice, the coded zones are formed by dividing up the electrically conductive elements 22, as shown by way of example in FIG. 6, these elements being electrically connected to one another in series by means of rods 28 and conductive bars 32 of the same type as those described hereinbefore with reference to FIGS. 1 to 3. Preferably, the zones thus defined on each of the sub-assemblies 16 are all the same length, which means that the lengths of the elements 22 and the spacings between two elements located in the same groove 20 or between one element and the end of the shell 18 are all multiples and sub-multiples of one another.

The apparatus described above with reference to FIGS. 1 to 6 operates as follows.

When the sub-assemblies 16 have been assembled and mounted on the conduit 10, as shown in FIG. 1, the configuration of the electrical detection circuits formed by the positioning of the conductive bars 32 is preferably defined to take account of the dimensions of each of the sub-assemblies 16, so as to permit any leak occurring in the conduit 10 to be located as accurately as possible. Thus, if the length of each sub-assembly 16 is two meters, an electric circuit limited to this sub-assembly will detect the leak relatively accurately, so that only this sub-assembly or the sub-assembly with which it surrounds the conduit 10 will have to be dismantled. If the sub-assemblies are 1 meter long, an electric circuit extending over two consecutive sub-assemblies will enable a leak to be located with the same degree of accuracy as in the above hypothesis. Obviously, in the case of FIG. 6, location of the leak can be achieved using the coding, which means that the configuration of the electric circuits is less important.

When a leak of liquid metal occurs in the conduit 10, because of the arrangement of the conductive elements 22 in the open grooves 20 the liquid metal seeping out of the leak comes into contact with one of the elements 22 almost instantaneously, provided that these elements are sufficiently close together. Moreover, owing to the helical configuration of the grooves 20 (FIG. 2), as a result of the forces of gravity acting on the liquid metal escaping through the leak, rapid detection of the leak is guaranteed both in a horizontal conduit and in a vertical or oblique conduit. However, it goes without saying that the invention is not limited to this particular embodiment and also applies, for example, in the case of longitudinal grooves (FIG. 6), in which case the sub-assemblies are preferably intended for horizontal conduits, or annular grooves, in which case the sub-assemblies are preferably intended for vertical conduits. In every case, given that the liquid metal does not have to pass through insulating layers before coming into contact with the electrically conductive elements 22, the electrical contact between the conduit 10 and these elements is established in a few seconds. With the terminals 1-2, 1'-2' or 1"-2" connected to the system 33 for detecting short circuits between the conduit 10 and each of these circuits, an alarm system such as a light or a sound warning is activated and this makes it possible to locate the leak rapidly by knowing which circuit or circuits is or are involved.

At the same time, as mentioned hereinbefore, the terminals 1-2, 1'-2', etc. of each of the circuits consisting of the electrically conductive elements 22, possibly linked by bars 32, are connected to a current source for heating the conduit 10 by a Joule effect, by using the electrically conductive elements 22 as heating resistors, whether these elements are in the form of a helically wound metal wire as shown in FIG. 3 or in the form of an undulating metal strip as shown in FIGS. 4 and 5.

Obviously, the invention is not limited to the embodiments described by way of examples, but covers all variants. Thus, although it is particularly adapted to detecting leaks of sodium, the invention can also be used for detecting leaks of any other liquid metal. Similarly, the form and dimensions of the sub-assemblies 16 may be modified as a function of the form and dimensions of the component of the circuit in which the liquid metal circulates, this component being a conduit, valve, etc., and they may also be adapted to detect leaks of liquid metal contained in a storage means such as a reservoir. Finally, the electrically conductive elements may be held at a spacing from the conduit or reservoir by any retaining means other than the provision of a portion of reduced width in the open grooves, provided that these means do not impede the passage of the liquid metal to the conductive elements in the case of a leak.

The invention is not limited to the embodiments described and represented hereinbefore and various modifications can be made thereto without passing beyond the scope of the invention.

We claim:

1. A sub-assembly for detecting leaks of a liquid metal contained in a component, comprising electrically conductive elements (22) arranged inside an electrically insulating material, wherein said insulating material consists of a rigid shell (18) the inner surface of which is adapted to the outer surface of said component (10), whilst open grooves (20) are formed on the inner surface of the shell for receiving said electrically conductive elements (22), the grooves (20) having a widened portion (26) remote from the inner surface of the shell, receiving the electrically conductive elements, and a portion of reduced width (24) located between the widened portion and the inner surface of the shell and maintaining the electrically conductive elements (22) at a spacing from said inner surface.

2. A sub-assembly according to claim 1, wherein the widened portion (26) of the grooves, in cross section, has a shape complementary to the outer casing of the electrically conductive elements (22).

3. A sub-assembly according to claim 1, wherein the electrically conductive elements (22) are helically wound metal wires inside the grooves (20).

4. A sub-assembly according to claim 1, wherein the electrically conductive elements (22) are metal strips forming undulations inside the grooves (20).

5. A sub-assembly according to claim 1, wherein the rigid shell (18) is made of a material comprising fibres embedded in a hardened reinforcing binder.

6. A sub-assembly according to claim 1, wherein the rigid shell (18) is in the form of a hollow half-cylinder whilst the grooves (20) are helical, parallel to one another and regularly spaced.

7. A sub-assembly according to claim 6, wherein the grooves (20) are inclined substantially at 45° relative to the axis of the shell (18).

8. A sub-assembly according to claim 1, wherein the rigid shell (18) is in the form of a hollow half-cylinder, whilst the grooves are parallel to the axis of the half-cylinder and regularly spaced.

9. A sub-assembly according to claim 8, wherein the electrically conductive elements (22) are arranged in the grooves (20) over different lengths and/or at different spacings, so as to define transverse zones which are electrically identifiable relative to one another.

10. A sub-assembly according to claim 1, wherein each of the electrically conductive elements (22) is electrically connected at both ends to terminals (28) opening on to the outer surface of the shell (18).

11. A sub-assembly according to claim 10, wherein electrically conductive bars (32) are arranged on the outer surface of the shell (18) between some of said terminals (28) so as to connect a plurality of electrically conductive elements (22) in series electrically.

12. An apparatus for detecting leaks of a liquid metal comprising a plurality of sub-assemblies (16) as claimed in claim 1, and means (33) for detecting a short circuit between the circuit (10) and any of the electrically conductive elements (22).

13. An apparatus according to claim 12, wherein the electrically conductive elements define heating resistors capable of being connected to a current source suitable for heating the circuit (10).

14. An apparatus according to claim 12, wherein the electrically conductive elements (22) housed in the grooves (20) formed in one or more of the rigid shells (18) are connected to one another to form adjacent loops connected to said means for detecting a short circuit (33).

15. An apparatus according to claim 12, wherein each of the electrically conductive elements is electrically connected at both ends to terminals opening onto the outer surface of the shell, and electrically conductive bars (32) are arranged on the outer surface of the shells (18) between some of the terminals (28) of two adjacent sub-assemblies (16), so as to connect the electrically conductive elements (22) of these sub-assemblies electrically in series.

* * * * *